United States Patent
Reinicke et al.

(10) Patent No.: US 7,533,690 B2
(45) Date of Patent: May 19, 2009

(54) MULTI-FUNCTIONAL REGULATOR

(75) Inventors: Robert H. Reinicke, Mission Viejo, CA (US); Peter C. M. Chow, Fullerton, CA (US)

(73) Assignee: Stanford Mu Corporation, Harbor City, CA (US)

( * ) Notice: Subject to any disclaimer, the term of this patent is extended or adjusted under 35 U.S.C. 154(b) by 243 days.

(21) Appl. No.: 11/482,431

(22) Filed: Jul. 7, 2006

(65) Prior Publication Data

US 2008/0023662 A1    Jan. 31, 2008

Related U.S. Application Data

(60) Provisional application No. 60/696,814, filed on Jul. 7, 2005.

(51) Int. Cl.
*G05D 7/06* (2006.01)
(52) U.S. Cl. .................... 137/487.5; 137/488
(58) Field of Classification Search .............. 137/487.5, 137/488, 613; 251/58, 38, 26, 31
See application file for complete search history.

(56) References Cited

U.S. PATENT DOCUMENTS

| | | | | |
|---|---|---|---|---|
| 2,973,935 | A * | 3/1961 | Sullivan | .................. 251/30.02 |
| 3,640,585 | A * | 2/1972 | Hamilton et al. .............. | 406/46 |
| 4,477,051 | A * | 10/1984 | Ben-Yehuda | ............. 251/30.01 |
| 4,892,286 | A | 1/1990 | Reinicke et al. | |
| 4,932,727 | A * | 6/1990 | Wagner et al. | ........... 303/114.3 |
| 5,024,418 | A | 6/1991 | Reinicke et al. | |
| 5,318,064 | A | 6/1994 | Reinicke | |
| 5,615,832 | A * | 4/1997 | Price | ............................. 239/8 |
| 6,026,847 | A | 2/2000 | Reinicke et al. | |
| 6,305,401 | B1 * | 10/2001 | Uehara et al. | ............... 137/102 |
| 6,584,999 | B2 * | 7/2003 | Inayama et al. | .......... 137/487.5 |
| 2002/0117214 | A1 * | 8/2002 | Tucker et al. | ............ 137/487.5 |
| 2003/0196707 | A1 * | 10/2003 | Meckes et al. | ......... 137/599.09 |
| 2004/0261855 | A1 * | 12/2004 | Hart et al. | .................... 137/486 |

* cited by examiner

*Primary Examiner*—Stephen M Hepperle
*Assistant Examiner*—William McCalister
(74) *Attorney, Agent, or Firm*—Gene Scott; Patent Law & Venture Group

(57) ABSTRACT

A multifunctional regulator provides a housing having an inlet passage joined with an outlet passage through a poppet valve. The housing has a control diaphragm separating the control chamber into a first volume and a second volume and depending on the differential pressure between the two volumes, the diaphragm will push open the poppet valve. Pressurizing and depressurizing valves join the first volume with the inlet and outlet passages, whereby, with an inlet pressure level within the inlet passage greater than an outlet pressure level within the outlet passage, and with the pressurizing valve admitting the inlet pressure level to the first volume, the diaphragm is displaced into the second volume thereby forcing the poppet valve to open and thereby raising the outlet pressure toward the inlet pressure with fluid flow from the inlet to outlet passages.

6 Claims, 6 Drawing Sheets

MULTI-FUNCTIONAL REGULATOR

CROSS-REFERENCE TO RELATED APPLICATIONS

This application claims priority of a prior filed and concurrently pending Provisional Patent Application having Ser. No. 60/696,814 and filing date Jul. 7, 2005, and which is incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to electronically enhanced mechanical fluid control devices and more particularly to a multifunctional device having fluid shutoff valve function as well as adjustable fluid regulator function; and to failsafe operation of such device using series and parallel arrangement redundancy.

2. Description of Related Art Including Information Disclosed Under 37 CFR 1.97 and 1.98

Tucker, et al., U.S. 2002/0117214, discloses a fluid delivery and control system for a fluid delivery line having elastic components. The system includes a pressure sensor, an electronically controlled valve, processing circuitry, and computer program code logic. The pressure sensor is operative to detect fluid pressure within a fluid delivery line. The electronically controlled valve includes an adjustable flow regulating aperture disposed in the line, interposed along a linear flow axis, and operative to regulate fluid flow through the line. The processing circuitry communicates with the pressure sensor and the electronically controlled valve. The computer program code logic is executed by the processing circuitry and is configured to generate an output signal. The output signal comprises an operating parameter of at least one of the pressure sensor and the electronically controlled valve to adjust flow capacity of the flow regulating aperture of the valve to dissipate pressure oscillations within the fluid delivery line. A method is also explained. Reinicke, et al., U.S. Pat. No. 4,892,286, discloses a modulating valve fluid regulator utilizing a two pole brushless DC motor that has the rotor mounted for axial and rotary movement. A poppet is directly carried by the rotor and lifted from the valve seat by a flexible band system which winds upon a mandrel upon rotation of the rotor, or by a cam system having ball bearing cam followers operating on an arcuate cam surface for maximizing torque. Magnetic fields of rotor permanent magnets reacting with the stator core to close the valve when no electrical power is present at the motor. Reinicke, et al., U.S. Pat. No. 5,024,418, discloses a poppet that is modulated between closed and full open positions by a brushless DC motor operating magnetically through a housing to drive a permanent magnet rotor which carries the poppet. The rotor is supported on several parallel cables which are fixed at one end and attached to the rotor at the other end, whereby rotation of the rotor twists the cables, causing axial foreshortening and axial translation of rotor and poppet. Axial translation is enhanced by placing a spacer between the cables, intermediate their ends. A permanent magnet ring is disposed around the valve seat directly axially attracting the rotor to a valve closed position. Reinicke, U.S. Pat. No. 5,318,064, discloses a valve construction wherein the rotor shaft of a reversible electric motor is axially displaceable between axially spaced elements of a differential-screw system for driven displacement of a valve member. Each of these spaced elements is preferably a ball screw, independently co-operative with upper and lower regions of the rotor shaft, i.e., at the respective upper and lower sides of the rotor carried by the shaft. The valve of the invention and its control and drive system are contained within a housing which fixedly mounts the ball-screw nut of the upper element of the differential-screw system and the stator of the motor, so that motor-driven rotation results in axial displacement of the rotor and its shaft, pursuant to the helical advance lead or pitch of the upper ball-screw nut. The ball-screw nut of the lower element of the differential-screw system is engaged to the shaft and axially displaceable yet effectively keyed against rotation with respect to the housing; and this lower ball-screw nut is adapted to provide axial displacement control of a poppet-valve member with respect to its coacting seat, in a valve-body passage between inlet and outlet ports of the valve. Great mechanical advantage is achieved for relatively low motor-torque delivery, when the helical leads (or pitches) of the respective ball screws are in the same direction but are slightly different. Reinicke, et al., U.S. Pat. No. 6,026,847, discloses systems, valves and methods for controlling fluid flow using the systems and the valves for applications involving the control of micro flow of fluids, such as, for example, spacecraft rocket thrusters, oil well production, medical/biological apparatus, industrial apparatus. The valves used in the systems and in the methods include a housing having a cavity and an inlet and an outlet. A seat is positioned in the housing and connected to both the inlet and the outlet. A poppet member is positioned in the cavity relative to the seat for controlling fluid flow from the inlet to the outlet. A magnetostrictive member is positioned in the cavity and connected to the poppet member. Electromagnetic excitation means are positioned in the cavity relative to the magnetostrictive member such that current applied to the electromagnetic excitation means controls the position of the poppet relative to the seat. The systems include a controller and associated sensor(s) for measuring any one of a plurality of parameters used to control the micro flow of fluids. A method for controlling fluid flow through the valves is also disclosed.

The related art described above discloses systems, valves, fluid controllers and methods of there use. However, the prior art fails to disclose a combination valve and flow regulator of the type presently described. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

The presently described apparatus is a multi-functional regulator (MFR) and control valve integrating the isolation and regulation functions of gas flow control systems into a single, compact device. The MFR serves as both a fail safe closed shutoff valve and a regulator, which is not possible in prior art devices. It is configured to return to a closed state should electrical power be lost, which is the desired "fail safe" state in virtually all aerospace system applications. The MFR consists of a pneumatic dome loaded regulator having: sensing element (including but not limited to a diaphragm, bellows or piston), sensing orifice, control chamber, poppet and seat, poppet spring, push pin and main spring, with added elements to enable electronic control, including: inlet pressure sensor, control chamber pressure sensor, a feedback (pressure, mass flow, or temperature) sensor, two electromagnetic operated pilot valves, and an electronic controller. The MFR provides pressure regulation, isolation, mass flow control, local or remote sensing, adjustable set point, and slam-start avoidance. Plural MFR's are arrange to provide fail-safe operation. The MFR is an integrated solution that substantially reduces the number and size of individual components in a system, greatly reducing system integration effort, weight, complexity and cost.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
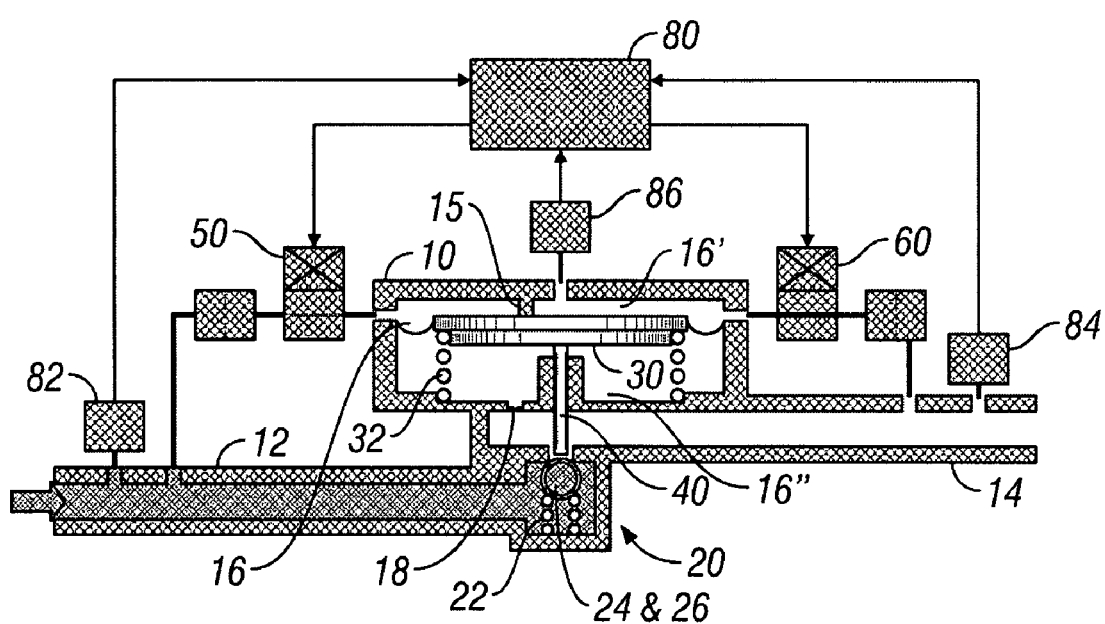
FIG. 1 is a schematic diagram of a first embodiment of the presently described apparatus shown in lockdown mode.

As shown in FIG. 1, the present multifunctional fluid control apparatus comprises a housing 10 providing integral portions including an inlet passage 12 joined with an outlet passage 14 through a poppet valve 20. A linearly movable control diaphragm 30 is biased to a nominal position by a main spring 32 within a control chamber 16, and separates the control chamber 16 into a first volume 16', often referred to in the literature as "the dome," and a second volume 16", sometimes referred to in the literature as a "sensing chamber." A push pin 40 engaged with the control diaphragm 30 is used to push open the poppet valve 20 as shown, so that as the diaphragm 30 moves down (into second volume 16"), it pushes the push pin 40 against the poppet valve 20, unseating it.

A pressurizing pilot valve 50 joins the inlet passage 12 with the first volume 16' for controlling fluid flow therebetween. A depressurizing pilot valve 60 joins the first volume 16' with the outlet passage 14 for controlling fluid flow therebetween.

Figure 2:
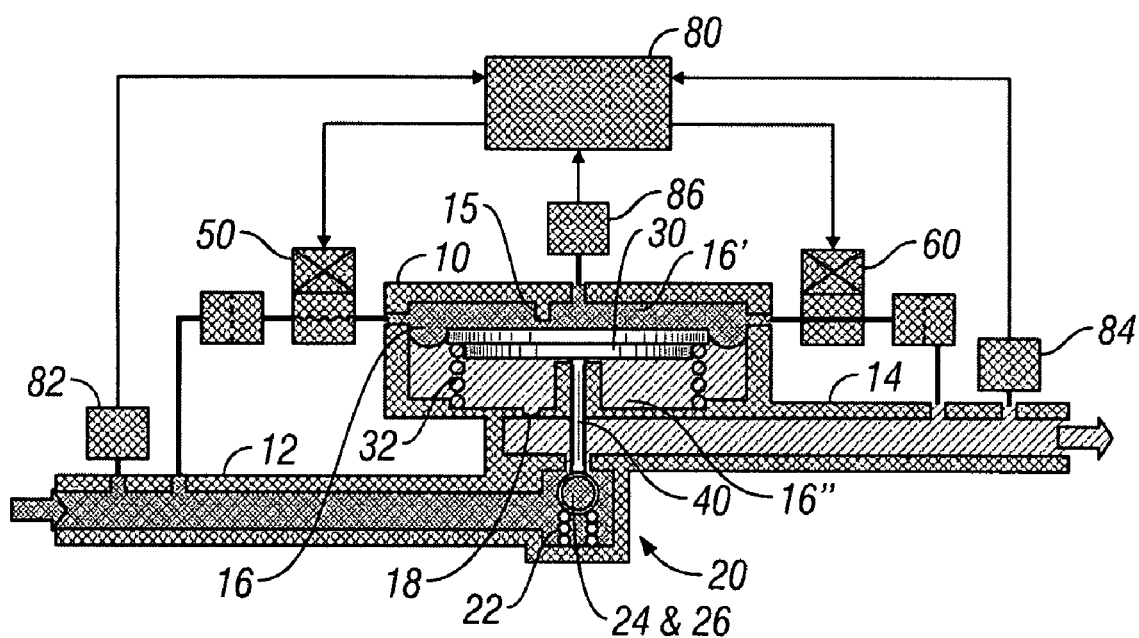
FIG. 2 is similar to FIG. 1 but shown in steady-state fluid flow mode with the control chamber pressurized.

The second volume 16" is joined with, or open to, the outlet passage 14 through a sensing orifice 18 so that the pressure exerted on the control diaphragm 30 from the second volume 16" is always essentially equal to the fluid pressure within the outlet passage 14. The sensing orifice 18 functions to enable smooth transitions in pressure within the outlet passage 14. Therefore, with an inlet pressure level $P_i$ within the inlet passage 12 greater than an outlet pressure level $P_o$ within the outlet passage 14, including the second volume 16", and with the pressurizing valve 50 admitting the inlet pressure level $P_i$ to the first volume 16', the control diaphragm 30 is displaced into the second volume 16" thereby forcing the push pin 40 into axial translation against the poppet valve 20 and thereby unseating it and raising the outlet pressure level $P_o$ toward the level of the inlet pressure $P_i$ and causing fluid flow between the inlet 12 and outlet 14 passages. This condition is illustrated in FIG. 2.

FIG. 1 shows the poppet valve 20 closed, which is the preferred position with the absence, or failure, of electrical power. The first volume 16' of the control chamber 16 is vented to the outlet passage 14 through the depressurizing valve 60, preferably an open latching solenoid valve. The poppet valve 20 is positioned closed by a poppet valve spring 22, and any inlet pressure that exists, preventing fluid flow to the outlet passage 14 even though a fluid inlet pressure is present, say 3000 psig. Note that the main spring 32 maintains the diaphragm 30 up against a travel stop 15, providing a clearance between the push pin 40 and the poppet valve 20, and assuring positive closure of the poppet 24 against its seat 26.

A control circuit is formed with an electronic controller 80, an inlet pressure sensor 82, which is in fluid communication with the inlet passage 12, and an outlet pressure sensor 84 which is in fluid communication with the outlet passage 14. The pressurizing valve 50, the depressurizing valve 60, and a control chamber pressure sensor 86, in fluid communication with first volume 16', complete the control circuit. This circuit is an integral and essential part of the present apparatus and necessary for its functional operation.

The electronic controller 80 is electrically powered to enable the opening and regulation control capabilities of the present apparatus. In the instance of a pressure; rather than mass flow rate or temperature regulation, element 84 is a pressure type feedback sensor wherein a pressure setpoint command signal, say 300 psig, is applied to the controller 80. The controller 80 closes the venting solenoid's latching valve 60 and opens the pressurizing, normally closed, solenoid valve 50 to increase pressure in the control chamber's first volume 16'. The resulting diaphragm force overcomes the main spring 32 so that pin 40 pushes the poppet 24 open, allowing flow through the apparatus and pressurization of the outlet passage 14.

When the outlet pressure $P_o$ reaches a commanded setpoint pressure, say 300 psig, which is sensed by the outlet feedback pressure sensor 84, the controller 80 de-energizes the inlet pressurizing solenoid valve 50, preventing further pressure increase and sealing the pressure in the first volume 16' of the control chamber 16, thereby keeping the poppet at an open position sufficient to assure a 300 psig setpoint pressure in the outlet passage 14.

FIG. 2 shows the apparatus at steady-state. Both the pressurizing solenoid 50 and the venting solenoid 60 valves are closed, sealing the pressure in the control chamber first volume 16'. Of course, fluid control devices are used in real-world systems where operating conditions do not remain fixed, and where it is desired to maintain a constant outlet pressure, or, indeed, another dynamic operating parameter. For example, referring to FIG. 2, assuming that operation requires a higher fluid flow rate which is typically enabled by reducing the flow restriction at the outlet of the apparatus. This causes the outlet pressure to drop below the setpoint command level. The electronic controller 80 acts on this setpoint error, and energizes open the pressurizing solenoid valve 50 to increase the pressure in first volume 16', thereby opening the poppet valve 20 further to increase the outlet pressure $P_o$, reducing the setpoint error. When the outlet pressure $P_o$ reaches the setpoint command pressure, the controller 80 de-energizes the inlet solenoid valve 50 to maintain the setpoint pressure and prevent overshoot of the outlet pressure $P_o$.

Conversely, should system operation require a reduced flow rate, or even total cessation of flow to "lockup," the outlet pressure $P_o$ would start to increase. The controller will command the outlet vent valve 60 open just long enough to vent and reduce the pressure in first volume 16', closing the poppet 24 to maintain the outlet pressure $P_o$ at the commanded setpoint level.

Similarly, any other operating condition, such as a reducing inlet pressure in a blow-down supply tank system, that causes the outlet pressure $P_o$ to move below the setpoint pressure will be operated on, energizing the pressurizing 50 and venting 60 valves open or closed to modulate the control chamber pressure, diaphragm position and poppet 24 position as needed to zero-out outlet pressure error.

Preferably, the controller 80 employs a state of the art PID (proportional, integral, derivative) control strategy to maintain stable operation and to prevent pressure overshoot or undershoot. The steady-state accuracy of the apparatus acting as a regulator is the precision of the pressure transducers, which are now available with accuracy better than ±1% using, for instance, the well known MEMS pressure sensor technology.

Should a system failure occur that causes electrical power to be lost and the electronic controller 80 to fail, it is almost always desirable to close the fluid control device, e.g., to achieve a "fail-safe closed" state in the poppet valve 20.

When the differential pressure across the diaphragm 30 exceeds the sealing force offered by the poppet bias spring 22 and the differential pressure force on the poppet 24, the poppet 24 is forced to open as discussed above. Fluid then flows into outlet passage 14. The outlet pressure increase is sensed in second volume 16" exerting an upward force to balance the downward force from the reference pressure in first volume 16'. The outlet pressure $P_o$ rises at essentially the same rate as the first volume 16' is pressurized. When the setpoint pressure is reached and sensed by the feedback pressure transducer 84, the pressurizing valve 50 is closed. The MFR then locks up (closes) until the next instance when flow is required to support operations.

In preferred applications such as in spacecraft thruster or deorbit engine operation (slowing of the spacecraft for deorbiting), the outlet pressure $P_o$ will experience a slight drop, upsetting the force equilibrium across the diaphragm 30. The poppet valve 20 will open, allowing flow to the downstream portion of the system through the outlet passage 14. If the reduced outlet pressure $P_o$, as sensed by the pressure transducer 84, remains well within its allowable control band, no control action will be taken; but if the reduced outlet pressure approaches the lower limit of the control band, the pressurizing valve 50 will open momentarily to increase the reference pressure and maintain the outlet pressure $P_o$ within its control band. A steady-state condition exists when the pneumatic load from the differential pressure force across the diaphragm 30 and the force of the poppet spring plus differential pressure load on the poppet 24 are in equilibrium.

During continuous flow demand, the outlet pressure $P_o$ will shift slightly upwards as the inlet pressure $P_i$ decreases when inlet flow is from a fixed volume supply tank. When the outlet pressure $P_o$ approaches the upper control limit, the depressurization valve 60 opens momentarily to maintain the outlet pressure within the control band.

Figure 3:
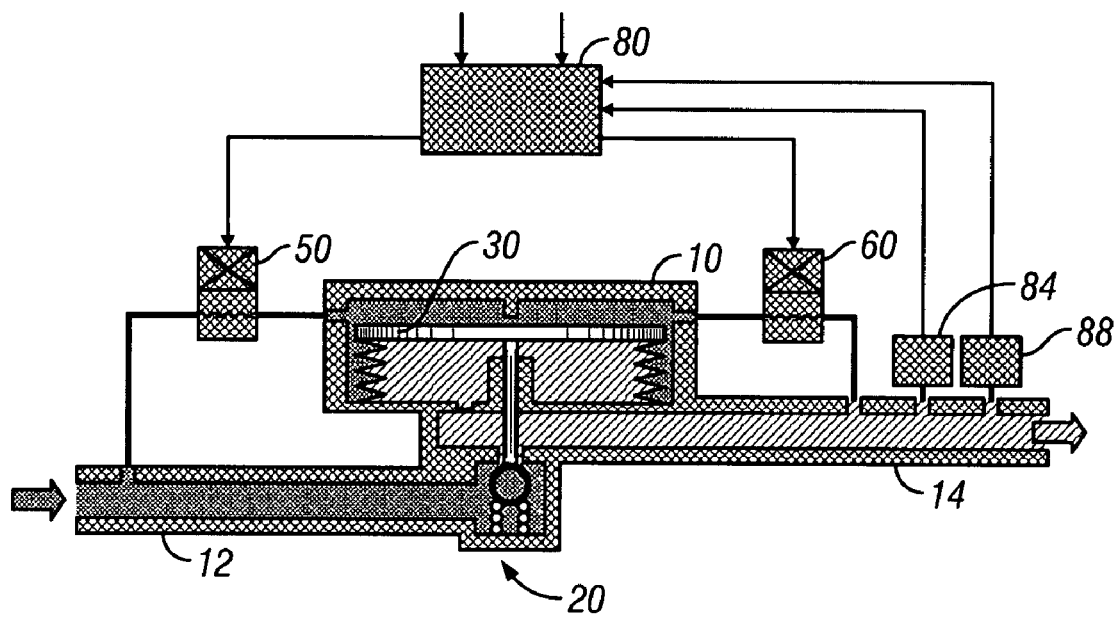
FIG. 3 is similar to FIG. 1 but shown in mass flow control mode.

When functioning as a Mass Flow Controller, the controller 80 continuously monitors the feedback from a temperature sensor 88, shown in FIG. 3, and computes the necessary controlled pressure to maintain the specified mass flow rate. If the differential between the feedback and the requirement approaches a limit of the control band, the controller 80 opens either the pressurization 50 or depressurization 60 valve momentarily to maintain the mass flow within the required control band.

When thruster or deorbit engine operation stops, the flow demand ceases and the outlet pressure $P_o$ will start to rise. This will cause the diaphragm 30 to move into first volume 16' thereby closing poppet 24 and establishing the lockup state. If the pressure rise remains within the allowable control band, no control action will be taken. If the pressure rise approaches the allowable control bank limit, the depressurization valve 60 will be commanded to open thereby equalizing the pressure in volume 16' to outlet pressure $P_o$ and causing the poppet valve 20 to close. This is true for either pressure control or mass flow control operation. With no differential pressure across the diaphragm 30, the MFR acts as an isolation valve.

Preferably, the pressure sensors, 82, 84 and 86 are strain gauge transducers which are well known in the art. The controller 80 is a typical microcomputer programmed for operation as defined above in PID mode to zero out each command setpoint error and produces pulse width modulation drive signals in operating valves 50 and 60. The other components in the electrical circuit are all elements well known to those of skill.

It may be necessary to arrange MFRs in "series redundant" or even "quad (quadruple) redundant" arrangements to prevent a single point failure from degrading, disabling, or even "blowing up" a critical pressurization or mass flow control system, such as used in space launch booster and upper stage rockets, in space stations, in satellites and in interplanetary spacecraft. Series redundancy (using 2 MFRs in series) allows the system to continue to operate without degradation even if one of the MFRs leaks excessively when commanded closed, regulates at too high of a pressure or even fails. Failure may occur when the poppet valve 20, pressurization valve 50 or depressurization valve 60 fails to control or is stuck in closed or open positions. A quad arrangement (2 series redundant MFRs connected in parallel) can tolerate a MFR that regulates at too low of a pressure or even fails in the completely closed position (fail close scenario).

Actually, a quad arrangement allows continued normal operation when a minimum of 1 MFR fails open at the same time that at least 1 other MFR fails closed. One approach, shown in FIGS. 3-6, is to electrically enable the MFRs in a series arrangement so they are both "active" normally, and command each of the controllers 80 to operate its MFR at a slightly different pressure setpoint. For example, having both MFRs enabled in a series arrangement, the downstream MFR is commanded to have its nominal setpoint of, for example, 300 psi, and the upstream MFR setpoint slightly higher, say 310 psi. This causes the downstream MFR to be the primary regulator regulating the outlet pressure at 300 psi. The upstream MFR opens just enough to feed gas to the downstream MFR while maintaining a small pressure drop. For example, lets say that the inlet pressure to the upstream MFR is 3000 psi. The upstream MFR would barely open so it has a small pressure drop, say 10 psia, just enough to overcome its diaphragm 30, poppet spring 22 and poppet closing forces, to open the poppet 24 and allow fluid flow. Should the downstream (primary) MFR fail to limit the pressure at 300 psi, and say, let the pressure creep up to 310 psi, which is defined as a "fail open," then the upstream (secondary) MFR will automatically start to modulate further closed as needed to keep outlet pressure from exceeding its setpoint of 310 psi.

If the downstream (primary) MFR should "fail closed" and allow the outlet pressure to drop below its commanded setpoint, 300 psia, the series redundant arrangement has failed. A way to guard against a possible "fail close" is to use two series redundant legs of MFRs in parallel, which forms a quad arrangement of MFRs. Both MFRs in the redundant leg would normally be commanded closed (pressurization valves 50 closed and de-pressurization valves 60 open. Should the primary leg of MFRs experience a fail close, e.g., outlet pressure dropping below 300 psi, both of these MFRs would be commanded closed and then the parallel secondary leg of MFRs would be enabled to operate in the regulation mode. Again, the pressure regulation set points would be slightly different, with the downstream (primary) regulator being set, for example, at 300 psi and the upstream (secondary) being set, for example, at 310 psi.

Figure 4:
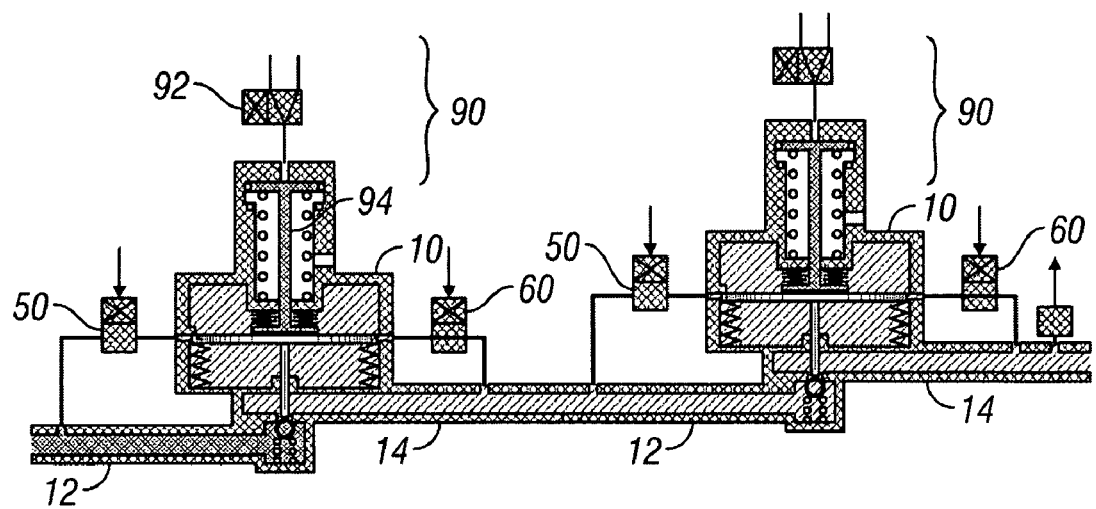
FIG. 4 is a schematic diagram of a second embodiment of the presently described apparatus shown with two apparatus in series connection and with both closed to fluid flow.
Figure 5:
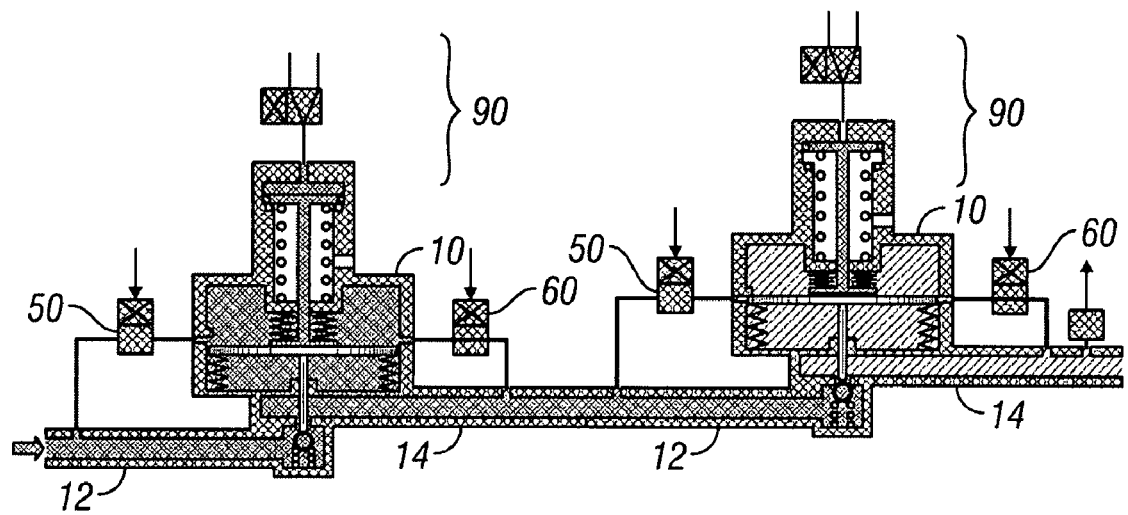
FIG. 5 is similar to FIG. 4 but showing an upstream unit energized full open using a three-way pilot valve and a pneumatic actuator, while a downstream unit is closed.
Figure 6:
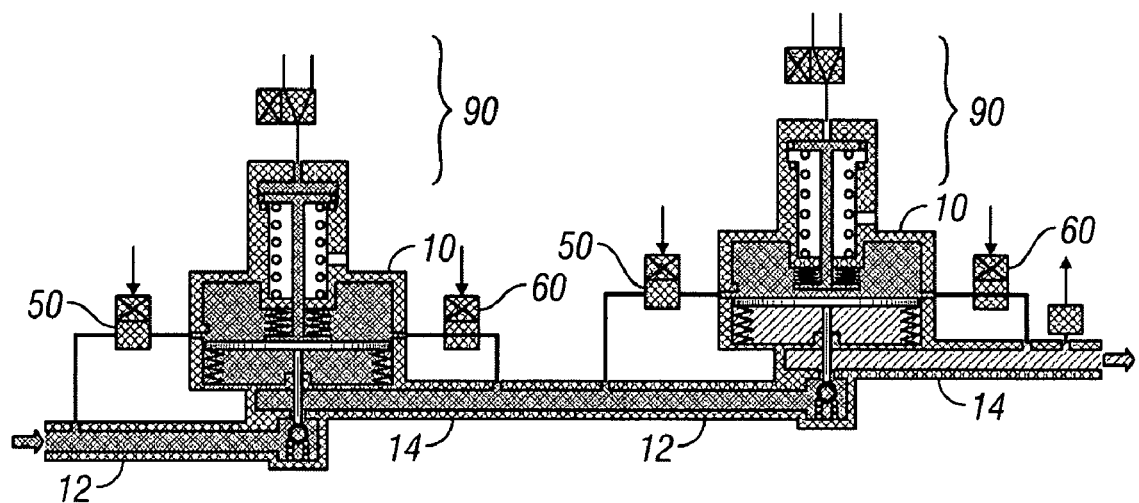
FIG. 6 is similar to FIG. 5 wherein the downstream unit is controlling.

Although the foregoing fail close and fail open scenarios are somewhat acceptable, the upstream (secondary) MFR in the active leg needs to be enabled in a pressure regulation mode even though it is in standby state. So, its controller 80 and pressurization/depressurization valves 50, 60 are constantly being operated to open the upstream MFR enough to pass flow. Also, the standby MFR poppet valve 20 is cycled repeatedly off and on its seat 26, i.e., modulated very close to the seat 26, which may deteriorate the sealing surfaces due to many closing impacts and contamination silting. In order to avoid this condition, the arrangement shown in FIGS. 4-6 is applied showing a means to keep the upstream (secondary) MFR in a full open state while it is in a standby state, avoiding all cycling and operation of the controller 80, and valves 20, 50, and 60. In this embodiment, a pneumatic piston actuator 90 has been added to each MFR. Its three-way solenoid valve 92 is de-energized, and its pneumatic actuator piston 94 is therefore not in contact with the diaphragm 30 whenever the MFR is in its closed and isolated valve mode or its pressure regulation mode as described previously. However, when it is necessary to hold the upstream (secondary) MFR open to allow the downstream (primary) MFR to operate in the isolation and pressure regulation modes, the upstream MFR three-way valve 92 is energized to pneumatically pressurize the actuator and thereby push the poppet valve 20 open. Should the downstream MFR fail open, the upstream MFR's three-way valve 92 is de-energized, allowing the upstream MFR to operate in both isolation and regulation modes.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A multifunctional fluid control apparatus comprising:
a housing having an inlet passage joined with an outlet passage through a poppet valve;
the housing further providing a control diaphragm within a control chamber, the control diaphragm separating the control chamber into a first volume thereof and a second volume thereof;
a push pin joining the control diaphragm with the poppet valve;
a pressurizing valve joining the inlet passage with the first volume for controlling fluid flow therebetween;
a depressurizing valve joining the first volume with one of the outlet passage and a vent; for controlling fluid flow between the first volume and one of the outlet passage and the vent;
a pneumatic piston actuator having a three-way solenoid valve and a pneumatic actuator piston, the pneumatic actuator piston positional between a non-contacting and a contacting positions relative to the diaphragm, wherein, in the contacting position, the poppet valve is opened.

2. The apparatus of claim 1 further comprising an electronic controller, an inlet pressure sensor fluidly communicating with the inlet passage and an outlet pressure sensor fluidly communicating with the outlet passage, forming, with the pressurizing valve and the depressurizing valve, a control circuit.

3. The apparatus of claim 2 wherein the control circuit further comprises a control chamber pressure sensor fluidly communicating with the first volume.

4. A pair of multifunctional fluid control apparatus each comprising:
- a housing having an inlet passage joined with an outlet passage through a poppet valve;
- the housing further providing a control diaphragm within a control chamber, the control diaphragm separating the control chamber into a first volume thereof and a second volume thereof;
- a push pin joining the control diaphragm with the poppet valve;
- a pressurizing valve joining the inlet passage with the first volume for fluid flow therebetween;
- a depressurizing valve joining the first volume with one of the outlet passage and a vent; for controlling fluid flow between the first volume and one of the outlet passage and the vent;
- the second volume joined with the outlet passage through a sensing orifice;
- a pneumatic piston actuator having a three-way solenoid valve and a pneumatic actuator piston positional between a non-contacting and a contacting positions relative to the diaphragm, wherein, in the contacting position, the poppet valve is opened wherein the pair of apparatus are arranged in series interconnection.

5. The apparatus of claim 4 further comprising, in each of the pair of multifunctional fluid control apparatus, an electronic controller, an inlet pressure sensor fluidly communicating with the inlet passage and an outlet pressure sensor fluidly communicating with the outlet passage, forming, with the pressurizing valve and the depressurizing valve, a control circuit.

6. The apparatus of claim 5 wherein, in each of the pair of multifunctional fluid control apparatus, the control circuit further comprises a control chamber pressure sensor fluidly communicating with the first volume.

* * * * *